United States Patent [19]

Mafoti et al.

[11] Patent Number: 5,804,618
[45] Date of Patent: Sep. 8, 1998

[54] ADHESIVE FOR BONDING DECORATIVE MELAMINE TREATED PAPER TO PARTICLE BOARD

[75] Inventors: Robson Mafoti, Temple; Tien-Chieh Chao, Round Rock, both of Tex.

[73] Assignee: Premark RWP Holdings, Inc., Wilmington, Del.

[21] Appl. No.: 739,399

[22] Filed: Oct. 31, 1996

Related U.S. Application Data

[63] Continuation-in-part of Ser. No. 688,932, Jul. 31, 1996.
[51] Int. Cl.$^6$ ........................................................ C08L 3/02
[52] U.S. Cl. .................................. 524/53; 524/52; 524/47; 524/261; 524/262; 524/296
[58] Field of Search ............................. 524/52, 47, 53, 524/261, 262, 296

[56] References Cited

U.S. PATENT DOCUMENTS

| | | | |
|---|---|---|---|
| 3,620,899 | 11/1971 | Kelly et al. | 524/52 X |
| 3,688,166 | 8/1972 | Kane et al. | 524/253 |
| 4,018,959 | 4/1977 | Demko et al. | 524/52 X |
| 4,131,581 | 12/1978 | Coker | 524/52 X |
| 4,287,103 | 9/1981 | Francis et al. | 524/52 X |
| 4,956,404 | 9/1990 | Pelzig | 524/48 |
| 5,091,458 | 2/1992 | Santoemma | 524/436 |

FOREIGN PATENT DOCUMENTS

| | | | |
|---|---|---|---|
| 0 323 691 B1 | 1/1992 | European Pat. Off. . | |
| 0 289 609 B1 | 2/1992 | European Pat. Off. . | |
| 0105536 | 9/1978 | Japan | 524/52 |

*Primary Examiner*—Judy M. Reddick
*Attorney, Agent, or Firm*—Gilbreth & Strozier, P.C.; J. Mark Gilbreth; Michael J. D'Amelio

[57] ABSTRACT

Polyvinyl acetate emulsion based adhesives can be made effective for bonding melamine formaldehyde resin treated decorative solid color and print paper to particle board. This polyvinyl acetate emulsion based adhesive is formulated with tackified polyvinyl alcohol, starch, a tackifier and a coupling agent. Stress cracking is substantially eliminated. Additionally, wrinkling and edge and corner peel resulting during the movement of sheets of melamine resin treated paper on the top and bottom surfaces of sheets of particle board through a heating and pressing zone is substantially eliminated.

25 Claims, No Drawings

1

ADHESIVE FOR BONDING DECORATIVE MELAMINE TREATED PAPER TO PARTICLE BOARD

This Application is a Continuation-In-Part of application Ser. No. 08/688,932, filed Jul. 31, 1996.

BACKGROUND OF THE INVENTION

1. Field of the Invention

This invention relates to polyvinyl acetate emulsion based adhesives for bonding melamine formaldehyde resin treated decorative solid color and print paper to particle board. This polyvinyl acetate emulsion based adhesive has sufficient wet bond strength for holding sheets of melamine resin treated paper on the top and bottom surfaces of sheets of particle board as these panels are moved through a heating and pressing zone. This adhesive substantially eliminates stress cracking of cured melamine resin treated paper on these panels. This adhesive substantially eliminates wrinkling and edge and corner peel resulting during the movement of these panels through a heating and pressing zone. This adhesive also bonds melamine formaldehyde resin treated paper to particle board with greater bond strength than the internal strength of the particle board. Thereby, melamine formaldehyde treated paper would not be separated from particle board unless sufficient force is applied for tearing pieces from the particle board.

2. Description of the Related Art

High pressure laminate can be adhesively bonded to a substrate material such as plywood, hardboard, particle board, cement-asbestos board, and the like, to give It additional strength and rigidity for its intended structural use. The bonding process usually requires, as the initial step, the sanding of the back surface of the laminate to ensure an adequate bond between the laminate and adhesive used in bonding the laminate and substrate material. The sanding step adds to the manufacturing costs of laminate. Laminates are relatively inflexible after the resins contained therein have been cured during the lamination process. Thin laminates (e.g., laminates comprising merely an overlay sheet, a decorative sheet, and single sheet of kraft paper or liner board) are particularly susceptible to damage during the sanding step due to their brittleness after lamination. The need for sanding can be obviated by coating the backing sheet with a thermoset adhesive. The resulting laminate is readily glueable to substrates with conventional adhesives. (Hosmer, et. al., U.S. Pat. No. 4,258,103)

A useful adhesive composition comprises copolyester elastomer and a compatible low molecular weight thermoplastic resin. The copolyester elastomer possesses improved adhesion particularly at high temperatures and under high applied stress. The copolyester elastomer consists essentially of a multiplicity of recurring short chain ester units and long chain ester units joined through ester linkages. These adhesive compositions have demonstrated improved adhesion to many substrates including difficulty adherable substrates such as melamine formaldehyde laminated plastics. This adhesive can also contain Tyzor brand tetrabutyltitanate sold by E. I. du Pont de Nemours and Company, Inc. (Edinger, U.S. Pat. No. 4,247,427)

Pressure sensitive adhesives formulated with organofunctional silane additive have improved adhesion, particularly to silane-modified acrylic/melamine paint systems. (Fisher, et. al. U.S. Pat. No. 5,354,600)

Solid color and print decorative paper can be made with a coating of melamine formaldehyde resin on its wear surface. Solid color and print decorative paper useful in the making of high and low pressure decorative laminate are useful in making the melamine formaldehyde coated paper. It is impregnated with resin for strength. It can be adhesively bonded to substrate such as particle board.

Melamine formaldehyde resin is impregnated into overlay and partially cured by passing the resin impregnated overlay through an oven. The overlay is positioned over decorative solid color or print paper that has not been impregnated with resin and laminated together under pressures of about 300–2000 psi (20–136 bar) and preferably about 750–1500 p.s.i. (51–102 bar).

The resin composition is adjusted for limiting flow as the partially cured resin in the overlay is laminated with decorative paper that has not been impregnated with resin. The resin in the overlay needs to flow through the decorative paper for impregnating and providing strength to the decorative paper. The flow needs to be limited so that the decorative side of the laminate has desired wear and decorative characteristics. The amount of resin on the opposite side of the laminate that is to be adhesively bonded to substrate is limited.

Solid color and print decorative paper coated with melamine formaldehyde resin have been adhesively bonded to particle board with commercially available wood glue, vinyl acetate-ethylene copolymer adhesive. This adhesive is commercially available under the product name Airflex 400H Emulsion from Air Products and Chemicals, 7201 Hamilton Boulevard, Allentown, Pa. 18195-1501.

Structural element laminates are prepared with an adhesive which comprises a copolymer of ethylene and vinyl acetate, a source of free radicals, and an organic compound source of silicon. If desired, various adjuvants such as tints, heat stabilizers, ultraviolet light stabilizers, ultraviolet light absorbers, fillers, and/or plasticizers can be incorporated in the ethylene-vinyl acetate copolymer without impairing its adhesion to the structural element laminae. (Snedeker, et. al. U.S. Pat. No. 3,622,440)

Where adjuvants are employed they must be materials which are physically and chemically compatible with each of the other components of the adhesive compositions under the described operating conditions. The adjuvants are used in amounts which will be effective for the intended purpose. Thus, for example, the effective amount of plasticizer is a plasticizing amount, that is, an amount of plasticizer that will appreciably increase the flexibility, processability, workability and/or distensibility of the copolymer based system. The stabilizers would be used in a stabilizingly effective quantity, and fillers would be used in effective quantities therefor, as for example, if a reinforcing filler is to be used, then the filler would be used in such amounts as to provide the desired reinforcing effect.

Polyvinyl alcohol is important not only as an emulsifier/protective colloid in the manufacture of polyvinyl acetate emulsions; it can also be added as a modifier for adjusting certain properties of adhesives. Certain bond properties can be influenced, open time can be increased, and viscosity decreases as a function of the viscosity of the polyvinyl alcohol solution. Thermal stability can be improved. Setting rate can be improved by optimizing the polyvinyl alcohol content. Stability in storage is better with partially hydrolyzed polyvinyl acetate than with fully hydrolyzed polyvinyl acetate. Additionally, tackified polyvinyl alcohol is useful in the formulation of polyvinyl acetate emulsion based adhesives and is commercially available.

Adhesion promoter may be used as a primer or incorporated into the adhesive. Examples of nonperoxidic organosilicon compounds which may be used as adhesion promoters include alkoxy silanes, aminoalkoxysilanes, vinylalkoxysilanes, epoxy alkyl alkoxy silanes, amino alkyl alkoxy silanes, cyano alkyl alkoxy silanes, hydroxy alkyl alkoxy silanes, and the like. (Snedeker, et. al. U.S. Pat. No. 3,622,440)

In preparing the laminates, a layer of the ethylene-vinyl acetate copolymer based adhesive is applied between each pair of laminae which are to be bonded together and the resulting laminae, after being laid up one upon the other, are bonded together under elevated temperature and pressure conditions. The bonding is preferably conducted at a temperature of about 80° to 205° C., and most preferably at about 110° to 140° C., and at a pressure of about 2 to 300 pounds per square inch (p.s.i.), and most preferably at a pressure of about 150 to 250 p.s.i. The bonding is conducted below the decomposition temperatures of all the components of the laminates, other than the free radical generating compounds, when such compounds are employed. Bonding operation may be conducted in any of the commonly employed pressurized devices that have been used by those in the art for preparing structural element laminates such as autoclaves and hydraulic presses and rolls. (Snedeker, et. al. U.S. Pat. No. 3,622,440) Bonding systems comprising a filler dispersed or suspended in a resin or adhesive material are improved, by improvement of bonding or associative interactions between filler particles and resin polymer. Improvements result through utilization of a coupling agent in the resin/filler suspension or mixture. These improvements result from inclusion of silane-, titanate-, or zircoaluminate-, coupling agent(s) in the resin/filler suspension. The coupling agent apparently acts to improve resin/filler interaction. The results in many instances are reduced viscosity of suspension, improved retention of filler within suspension and/or, improved strength and/or water insensitivity of the bonding system in the overall product. A variety of silane-, titanate-, or zircoaluminate-, coupling agents may be used. (DeWald, U.S. Pat. No. 4,871,376)

Coupling agents typically operate through two different reactive functionalities, an organofunctional moiety and an inorganic functional moiety. When a coated abrasive bond system (i.e., adhesive/filler mixture) is modified with a coupling agent, the organofunctional group of the coupling agent becomes bonded to, or otherwise attracted to or associated with, the adhesive/resin matrix, as the adhesive polymerizes. The inorganic functional moiety appears to generate bonding or similar association with the dispersed inorganic filler. Thus, the coupling agent acts as a bridge between the organic resinous adhesive and the inorganic filler. (DeWald, U.S. Pat. No. 4,871,376)

There is a need for a polyvinyl acetate emulsion based adhesive with sufficient wet bond strength for holding sheets of melamine resin treated paper on the top and bottom surfaces of sheets of particle board as these panels are moved through a heating and pressing zone. The polyvinyl acetate emulsion based adhesive is cured in the heating and pressing zone for bonding sheets of melamine resin treated paper on these panels. There is a need to substantially eliminate stress cracking of cured melamine resin on these panels. There is also a need for substantially eliminating wrinkling and edge and corner peel resulting during the movement of these panels through a heating and pressing zone. The polyvinyl acetate emulsion based adhesive must also adhesively bond melamine formaldehyde resin treated paper to particle board with greater bond strength than the internal strength of the particle board. Thereby, melamine formaldehyde treated paper would not be separate from particle board unless sufficient force is applied for tearing pieces from the particle board.

SUMMARY OF THE INVENTION

It has now been discovered that a polyvinyl acetate emulsion can be formulated as an adhesive with, tackified polyvinyl alcohol, starch, a tackifier and a coupling agent for effectively bonding sheets of melamine resin treated paper on the top and bottom surfaces of sheets of particle board. Stress cracking is substantially eliminated. Additionally, wrinkling and edge and corner peel resulting during the movement of these panels through a heating and pressing zone is substantially eliminated.

The polyvinyl acetate based adhesive of this invention is formulated with about 1.5–4.5, preferably about 14, and most preferably about 3.5 percent tackified polyvinyl alcohol solids by weight of the adhesive. This adhesive is also formulated with about 20–35 percent starch solids. Preferably the starch is corn starch having a particle size of about 5–25 micron and a median particle size of about 15 microns. This adhesive is also formulated with about 0–15 and preferably about 5–10 percent tackifier solids. Preferably the tackifier is butyl benzyl phthalate. Additionally, this adhesive is formulated with about 1–5 and preferably about 1.5–2.5 percent coupling agent solids. Suitable coulping agents are water soluble or dispersible silane, titanium and zircoaluminate coupling agents and preferably titanium and zircoaluminate coupling agents. The most preferred coupling agent is Tyzor 131 brand coupling agent, a mixed titanium ortho ester complex, commercially available from Du Pont Chemicals, 1007 Market Street, Wilmington, Del. 19898.

A preferred embodiment of this invention has the following formulation:

| Component | Amount* | Chemical | Manufacturer |
|---|---|---|---|
| XX-240 | 60.25 | Vinyl Acetate Homopolymer Emulsion | Air Products & Chemicals P. O. Box 538 Allentown, PA 18105 |
| Airvol 523 (Tackified) | 3.6 | Polyvinyl Alcohol | Air Products & Chemicals P. O. Box 2662 Allentown, PA 18105 |
| Pearl Starch | 25.7 | Corn Starch | A. E. Staley Mfg. Co. 2200 East Eldorado Decatur, IL 62525 |
| Santicizer 160 | 8.6 | Butyl Benzyl Phthalate | Monsanto Company 800 North Lindbergh Blvd. St. Louis, MO 63167 |
| Tyzor 131 | 1.85 | Mixed Titanium Ortho Ester Complex | Du Pont Chemicals 1007 Market Street Wilmington, DE 19898 |

*Amount is percent solids by weight of the solids in the adhesive.

The polyvinyl acetate emulsion based adhesive of this preferred embodiment has sufficient wet bond strength for holding sheets of melamine resin treated paper on the top and bottom surfaces of sheets of particle board as they are moved through a heating and pressing zone. It substantially eliminate stress cracking of these panels of melamine resin treated paper bonded to particle board. It also substantially eliminates wrinkling and edge and corner peel resulting during the movement of these panels through a heating and pressing zone. This adhesive also bonds melamine formaldehyde resin treated paper to particle board with greater bond strength than the internal strength of the particle board. Thereby, melamine formaldehyde treated paper can not be separate from particle board unless sufficient force is applied for tearing pieces from the particle board.

Tackified polyvinyl alcohol of this preferred embodiment is made by agitating about 837 grams of water, adding 8 grams of boric acid and 3.2 grams of phosphoric acid and then 150 grams of Airvol 523. About 1.8 grams of Mazu DF 132 (defoamer) is then added to the mix. The mix is then heated to about 200° F. and maintained at 200° F. for about 30 minutes. The mix is cooled to ambient temperature before use. Airvol 523 brand polyvinyl alcohol is polyvinyl acetate that has been hydrolyzed to about 87–89 percent polyvinyl alcohol by weight. Airvol 523 is commercially available from Air Products & Chemicals, P. O. Box 2662, Allentown, Pa. 18105. Mazu DF 132 brand name defoamer is commercially available from PPG Industries, Inc., PPG Place, Pittsburgh, Pa. 15272.

DETAILED DESCRIPTION OF THE INVENTION

Tackified Polyvinyl Alcohol

The formulation of polyvinyl acetate emulsion adhesive with two different amounts of tackified polyvinyl alcohol is illustrated by the following examples. Tackified polyvinyl alcohol used in these examples was made by the procedure previously described for the preferred embodiment. Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples, with two concentrations of tackified polyvinyl alcohol, have the following formulations:

| Component | Amount* | Chemical | Manufacturer |
| --- | --- | --- | --- |
| XX-240 | 60.25/ 62.05 | Vinyl Acetate Homopolymer Emulsion | Air Products & Chemicals P. O. Box 538 Allentown, PA 18105 |
| Airvol 523 (Tackified) | 1.8/3.6 | Polyvinyl Alcohol | Air Products & Chemicals P. O. Box 2662 Allentown, PA 18105 |
| Pearl Starch | 25.7/ 25.7 | Corn Starch | A. E. Staley Mfg. Co. 2200 East Eldorado Decatur, IL 62525 |
| Santicizer 160 | 8.6/8.6 | Butyl Benzyl Phthalate (Tackifier) | Monsanto Company 800 North Lindbergh Blvd. St. Louis, MO 63167 |
| Tyzor 131 | 1.85/ 1.85 | Mixed Titanium Ortho Ester Complex | Du Pont Chemicals 1007 Market Street Wilmington, DE 19898 |

*Amount is percent solids by weight of the solids in the adhesive.

Corner peel-back determinations were based on more than 10 panels made by bonding four by eight foot sheets of melamine resin treated paper on the top and bottom surfaces of four by eight foot sheets of particle board with an adhesive of these examples as they are moved through a heating and pressing zone. Every occurrence of corner peel represents a defected products.

Two notches are cut along each edge of a twelve by twelve inch sample cut from each of these panels. Thereafter, the sample is placed in a oven at 65° C. for 24 hours. After the sample is removed from the oven and cools to ambient temperature, it is examined for cracks.

Cracking occurs only on notches along sides of the samples representing the machine direction for the paper. Machine direction for the paper is the side of the paper formed along a forming screen on a paper making machine. A "Good" rating for stress cracking indicates that no cracks were found in 95% or higher of the notched areas in the cross direction on the samples. A "Fair" means no cracks were found in 90% or higher of the notched areas in the cross direction on the samples. The cracks in these samples extended less than on fourth inch from notches along the edges of the panel. Cracking did not occur outside the notches. Notching represents a severe test condition.

| % Tackified PVOH | Corner Peel-Back | Stress Crack |
| --- | --- | --- |
| 3.6 | 0–10% | good |
| 1.8 | 10–20% | fair |

The formulation of polyvinyl acetate emulsion adhesive with three different amounts of tackified polyvinyl alcohol is illustrated by the following examples. Tackified polyvinyl alcohol used in these examples was made by the procedure previously described for the preferred embodiment. Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples, with three concentrations of tackified polyvinyl alcohol, have the following formulations:

| Component | Amount* | Chemical | Manufacturer |
| --- | --- | --- | --- |
| XX-240 | 64.5/67.6/ 70.9 | Vinyl Acetate Homopolymer Emulsion | Air Products & Chemicals P. O. Box 538 Allentown, PA 18105 |
| Airvol 523 (Tackified) | 5.6/3.7/1.8 | Polyvinyl Alcohol | Air Products & Chemicals P. O. Box 2662 Allentown, PA 18105 |
| Pearl Starch | 27.9/26.7/ 25.5 | Corn Starch | A. E. Staley Mfg. Co. 2200 East Eldorado Decatur, IL 62525 |
| Tyzor 131 | 2/1.9/1.8 | Mixed Titanium Ortho Ester Complex | Du Pont Chemicals 1007 Market Street Wilmington, DE 19898 |

*Amount is percent solids by weight of the solids in the adhesive.

Corner peel back and stress cracking is determined by procedure described for the previous examples.

| % Tackified PVOH | Corner Peel-Back | Stress Crack |
| --- | --- | --- |
| 5.6 | severe | good |
| 3.7 | 10–20% | good |
| 1.8 | 10–20% | fair |

Polyvinyl Alcohol

The formulation of polyvinyl acetate emulsion adhesive with two different amounts of polyvinyl alcohol is illustrated by the following examples. Polyvinyl alcohol used in the following examples is made by mixing 1,709 pounds of Airvol 540 brand polyvinyl alcohol, commercially available from Air Products & Chemicals, P. O. Box 2662, Allentown, Pa. 18105, with 34 pounds of Mazu DF 132 brand proprietary defoamer, commercially available from PPG Industries, Inc., PPG Place, Pittsburgh, Pa. 15272, and 17 pounds Nuosept 95 brand preservative (tetrahydroxy-3,5-dimethyl-2H-1,3,5,thiadiazine-2- thi), commercially available from Huls America, Inc., P. O. Box 365, Piscataway, N.J. 08854, and 15,328 pounds of water.

Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples, with two concentrations of polyvinyl alcohol, have the following formulations:

| Component | Amount* | Chemical | Manufacturer |
|---|---|---|---|
| XX-240 | 58/62.9 | Vinyl Acetate Homopolymer Emulsion | Air Products & Chemicals P. O. Box 538 Allentown, PA 18105 |
| Airvol 540 (Blend) | 3.6/1.7 | Polyvinyl Alcohol | Air Products & Chemicals P. O. Box 2662 Allentown, PA 18105 |
| Pearl Starch | 27.3/25.2 | Corn Starch | A. E. Staley Mfg. Co. 2200 East Eldorado Decatur, IL 62525 |
| Santicizer 160 | 9.1/8.4 | Butyl Benzyl Phthalate (Tackifier) | Monsanto Company 800 North Lindbergh Blvd. St. Louis, MO 63167 |
| Tyzor 131 | 2/1.8 | Mixed Titanium Ortho Ester Complex | Du Pont Chemicals 1007 Market Street Wilmington, DE 19898 |

*Amount is percent solids by weight of the solids in the adhesive.

Corner peel back and stress cracking is determined by procedure described for the previous examples.

| % PVOH | % Tackifier | Corner Peel-Back | Stress Crack |
|---|---|---|---|
| 3.6 | 5 | severe | good |
| 1.7 | 5 | severe | good–fair |

The formulation of polyvinyl acetate emulsion adhesive with two different amounts of polyvinyl alcohol is illustrated by the following examples. Polyvinyl alcohol used in the following examples is made by mixing 1,709 pounds of Airvol 540 brand polyvinyl alcohol, commercially available from Air Products & Chemicals, P. O. Box 2662, Allentown, Pa. 18105, with 34 pounds of Mazu DF 132 brand proprietary defoamer, commercially available from PPG Industries, Inc., PPG Place, Pittsburgh, PA 15272, and 17 pounds Nuosept 95 brand preservative (tetrahydroxy-3,5-dimethyl-2H-1,3,5,thiadiazine-2- thi), commercially available from Huls America, Inc., P. O. Box 365, Piscataway, N.J. 08854, and 15,328 pounds of water.

Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples, with two concentrations of polyvinyl alcohol, have the following formulations:

| Component | Amount* | Chemical | Manufacturer |
|---|---|---|---|
| XX-240 | 65.7/70.2 | Vinyl Acetate Homopolymer Emulsion | Air Products & Chemicals P. O. Box 538 Allentown, PA 18105 |
| Airvol 540 (Blend) | 3.8/1.7 | Polyvinyl Alcohol | Air Products & Chemicals P. O. Box 2662 Allentown, PA 18105 |
| Pearl Starch | 28.05/26.2 | Corn Starch | A. E. Staley Mfg. Co. 2200 East Eldorado Decatur, IL 62525 |
| Tyzor 131 | 2/1.9 | Mixed Titanium Ortho Ester Complex | Du Pont Chemicals 1007 Market Street Wilmington, DE 19898 |

*Amount is percent solids by weight of the solids in the adhesive.

Corner peel back and stress cracking is determined by procedure described for the previous examples.

| % PVOH | Corner Peel-Back | Stress Crack |
|---|---|---|
| 3.8 | severe | good |
| 1.7 | severe | good–fair |

Starch

The formulation of polyvinyl acetate emulsion adhesive with different amounts of starch and different basis weights of decorative paper is illustrated by the following examples. Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples have the following formulations:

| Component | Amount* | Chemical | Manufacturer |
|---|---|---|---|
| XX-240 | 69–88 | Vinyl Acetate Homopolymer | Air Products & Chemicals P. O. Box 538 Allentown, PA 18105 |
| Pearl Starch | 5–24 | Corn Starch | A. E. Staley Mfg. Co. 2200 East Eldorado Decatur, IL 62525 |
| Santicizer 160 | 5 | Butyl Benzyl Phthalate (Tackifier) | Monsanto Company 800 North Lindbergh Blvd. St. Louis, MO 63167 |
| Tyzor 131 | 2 | Mixed Titanium Ortho Ester Complex | Du Pont Chemicals 1007 Market Street Wilmington, DE 19898 |

*Amount is percent by weight of the adhesive.

Two notches are cut along each edge of a twelve by twelve inch sample cut from each of these panels.

Thereafter, the sample is placed in a oven at 65° C. for 24 hours. After the sample is removed from the oven and cools to ambient temperature, it is examined for cracks. The length of the longest crack is reported. Frequency of cracks extending form notches along the machine direction of paper are reported. Each sample has two notches along each of its machine direction sides. Cracking did not occur on notches along sides of the samples representing the cross direction for the paper. Machine direction for the paper is the side of the paper formed along a forming screen of a paper making machine, cross direction is across the forming screen. Cracking did not occur outside the notches. Notching represents a severe test condition.

-continued

| Component | Amount* | Chemical | Manufacturer |
|---|---|---|---|
| Tyzor 131 | 1 | Mixed Titanium Ortho Ester Complex | Du Pont Chemicals 1007 Market Street Wilmington, DE 19898 |

*Amount is percent by weight of the adhesive.

Two notches are cut along each edge of a twelve by twelve inch sample cut from each of these panels.

| Starch* | 85 lb.** | 75 lb.** | 62 lb.** | 50 lb.** | 43 lbs** |
|---|---|---|---|---|---|
| 5 | 3/4" (8/8) | 3/4" (4/8) | 1 3/8" (2/4) | 3/4" (5/8) | 1/2" (4/8) |
| 10 | 1/2" (5/8) | 1/2" (1/8) | 1/2" (7/8) | 5/16" (6/8) | 5/16" (5/8) |
| 15 | 5/16" (11/16) | 0" (9/16) | 1/4" (8/16) | 1/8" (11/16) | 1/8" (9/16) |
| 18 | 3/8" (3/16) | 0" (9/16) | 1/4" (2/16) | 1/4" (11/16) | 3/16" (13/16) |
| 20 | 1/8" (1/16) | 1/16" (1/16) | 1/8" (3/16) | 3/16" (5/16) | 1/16" (3/16) |
| 22 | 5/16" (11/16) | 3/16" (2/16) | 1/4" (6/16) | 3/16" (12/16) | 1/16" (5/16) |
| 24 | 1/4" (3/16) | 7/16" (1/16) | 1/8" (3/16) | 1/4" (10/16) | 1/8" (6/16) |

*Starch is percent by weight of the adhesive.
**Basis weight of decorative paper in pounds per 3000 square foot.

The formulation of polyvinyl acetate emulsion adhesive with different amounts of starch and different basis weights of decorative paper is illustrated by the following examples. Adhesives of these examples were applied to both sides of four by eight foot sheets of particle board at 4 to 8 grams (wet)/sq.ft. for a coating of adhesive that is about 0.004 to 0.008 inches thick. A four by eight foot sheet of melamine treated paper is placed on each of the adhesive treated surfaces and the resulting panel is moved through a heating zone. Residence time in the heating zone is about 40 seconds. These panels enter the heating zone at ambient temperature and exit at about 180°–200° F. Pressure of 30–40 psi is applied through nip rollers as the panel is moved through the heating zone. The adhesive of these examples have the following formulations:

| Component | Amount* | Chemical | Manufacturer |
|---|---|---|---|
| XX-240 | 70–89 | Vinyl Acetate Homopolymer | Air Products & Chemicals P. O. Box 538 Allentown, PA 18105 |
| Pearl Starch | 5–24 | Corn Starch | A. E. Staley Mfg. Co. 2200 East Eldorado Decatur, IL 62525 |
| Santicizer 160 | 5 | Butyl Benzyl Phthalate (Tackifier) | Monsanto Company 800 North Lindbergh Blvd. St. Louis, MO 63167 |

Thereafter, the sample is placed in a oven at 65° C. for 24 hours. After the sample is removed from the oven and cools to ambient temperature, it is examined for cracks. The length of the longest crack is reported. Frequency of cracks extending from notches along the machine direction of paper are reported. Each sample has two notches along each of its machine direction sides. Cracking did not occur on notches along sides of the samples representing the cross direction for the paper. Machine direction for the paper is the side of the paper formed along a forming screen of a paper making machine, cross direction is across the forming screen. Cracking did not occur outside the notches. Notching represents a severe test condition.

| Starch* | 85 lb.** | 75 lb.** | 62 lb.** | 50 lb.** | 43 lb.* |
|---|---|---|---|---|---|
| 15 | 5/8" (12/16) | 0" (9/16) | 1/4" (12/16) | 1/4" (11/16) | 1/16" (11/16) |
| 18 | 3/8" (1/16) | 0" (9/16) | 3/4" (5/16) | 1/4" (14/16) | 1/4" (14/16) |
| 20 | 0" (9/16) | 0" (9/16) | 0" (9/16) | 3/16" (7/16) | 1/16" (7/16) |
| 22 | 3/8" (12/16) | 1/4" (7/16) | 5/16" (8/16) | 1/4" (15/16) | 1/8" (11/16) |
| 24 | 1/2" (11/16) | 1/4" (4/16) | 5/16" (6/16) | 3/16" (8/16) | 3/16" (9/16) |

*Starch is percent by weight of the adhesive.
**Basis weight of decorative paper in pounds per 3000 square foot.

Coupling Agents

Water soluble and dispersible silane, titanium and zircoaluminate coupling agents can be used in polyvinyl acetate emulsion adhesive formulations for increasing the strength of the bond between melamine formaldehyde resin treated paper and particle board. Preferred coupling agents are titanate or zircoaluminate coupling agents. Additionally, melamine treated paper can shrink as it further cures during the bonding of the melamine formaldehyde treated paper to particle board under temperature and pressure.

Titanium coupling agents and zircoaluminate coupling agents that are useful in the adhesive of this invention are water soluble or dispersible and that can be used in the pH range of 2–6. Tyzor LA Titanate—dihydroxybis (ammonium lactato) titanium and Tyzor 131 Titanate—mixed titanium ortho ester complexes supplied by Du Pont Chemicals increase adhesive bond strength. Manchem CPG—carboxy zircoaluminate and Manchem APO-X -amino zircoaluminate solution supplied by Rhone-Poulenc Inc. also increase adhesive bond strength.

Silane coupling agents, including Silquest A-187 Silane—gama-glycidoxypropyltrimethoxy-silane, Silquest A- 1100 Silane—gamma-aminopropyltriethoxy-silane, and Silquest A-1128 Silane—amino modified organosilane ester supplied by OSI Specialties, Inc., also increase bond strength. However, silane coupling agents may not have sufficient stability in polyvinyl acetate emulsion based adhesives for long term storage prior to use.

Coupling agents are effective in the range of 0.5–5.0, preferably 0.5–4 and most preferably 1.5–3 percent by weight of the adhesive formulation. Higher concentrations of coupling agents can reduce the bonding capability of adhesive formulations.

The effectiveness of polyvinyl acetate emulsion based adhesives for bonding melamine formaldehyde resin treated decorative solid color and print paper to particle board is illustrated by the following examples. In these examples, titanate, zircoaluminate and silane coupling agents are formulated in an adhesive containing polyvinyl acetate emulsion and polyvinyl alcohol. This adhesive has the following formulation:

| Component | A-mount* | Chemical | Manufacturer |
|---|---|---|---|
| XX-240 | 26.05 | Vinyl Acetate Homopolymer | Air Products & Chemicals P. O. Box 538 Allentown, PA 18105 |
| Pearl Starch | 23.68 | Corn Starch | A. E. Staley Mfg. Co. 2200 East Eldorado Decatur, IL 62525 |
| Airvol 540 | 4.74 | Polyvinyl Alcohol | Air Products & Chemicals P. O. Box 2662 Allentown, PA 18105 |
| Ethylene Glycol | 1.77 | Ethylene Glycol | Celanese Chemical Co. 1250 West Mockingbird Dallas, TX 75247 |
| Tektamer 38AD | 0.29 | 1,2-dibromo-2,4-dicyanobutane | Calgon Corporation P. O. Box 1346 Pittsburgh, PA 15230 |
| Nuosept 95 | 0.32 | Bicyclic Oxazolidines Solution | Huls America, Inc. P. O. Box 365 Piscataway, NJ 08854 |
| Mazu DF 132 | 0.40 | Proprietary Defoamer | PPG Industries, Inc. PPG Place Pittsburgh, PA 15272 |
| Nuosept 120 | 0.09 | tetrahydroxy-3,5-dimethyl-2H-1,3,5,thiadiazine-2-thi | Huls America, Inc. P. O. Box 365 Piscataway, NJ 08854 |
| Water | 42.66 | | |

*Amount is percent by weight of the adhesive.

Cross Hatch Test

The melamine formaldehyde treated paper is scored with a utility knife in a pattern resembling a number sign, #. The tip of the knife is used to separate the melamine formaldehyde treated paper from the particle board. If only particle board bonded to melamine formaldehyde treated paper is removed, the bond is considered as good (P). If no particle board removed with the melamine formaldehyde treated paper, the bond is considered as a failure (F).

The cross hatch test is performed two times: at room temperature, 24 hours after the sample is assembled (Before) and after the product has been placed in an oven at 70° C. for 24 hours and cooled to room temperature (After)

Thermal Stress Crack

Initiate cracks on the edges of panels, place in a oven at 70° C. for 24 hours, and then examine for crack growth at the pre-notched points after. To pass this test, the crack growth must be less than ¼ inches long.

Tyzor® 131 titanate is mixed with the adhesive of this example at the concentration shown on the following table. Concentration is percent by weight of the adhesive of this example. Tyzor 131 is a mixed titanium ortho ester complex and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Tyzor® LA titanate is mixed with the adhesive of this example at the concentration shown on the following table. Concentration is percent by weight of the adhesive of this example. Tyzor LA is dihydroxybis (ammonium lactato) titanium and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Tyzor® GBA titanate was mixed with the adhesive of this example. The adhesive became too viscous for bonding melamine formaldehyde treated decorative paper to particle board. Tyzor GBA is described in NJ Trade Secret Registry # 008502010015522P and is commercially available from Du Pont Chemicals, 1007 Market Street, Wilmington, Del. 19898.

Tyzor® TE titanate is mixed with the adhesive of this example. The adhesive became too viscous for bonding melamine formaldehyde treated decorative paper to particle board. Tyzor TE is titanium, isopropoxy(triethanolaminato) and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Manchem CPG is mixed with the adhesive of this example at the concentration shown on the following table. Concentration is percent by weight of the adhesive of this example. Manchem CPG is a carboxy zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Manchem APG-X is mixed with the adhesive of this example at the concentration shown on the following table. Concentration is percent by weight of the adhesive of this example. Manchem APG-X is an amino zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Silquest A-1100 silane is mixed with the adhesive of this example at the concentration shown on the following table. Concentration is percent by weight of the adhesive of this example. Silquest A-1100 is gamma-aminopropyltriethoxysilane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

Silquest A-1128 silane is mixed with the adhesive of this example at the concentration shown on the following table. Concentration is percent by weight of the adhesive of this example. Silquest A-1128 is an amino functional silane ester and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | F | F |
| 4.0 | F | F | F |

Silquest A-187 silane is mixed with the adhesive of this example at the concentration shown on the following table. Concentration is percent by weight of the adhesive of this example. Silquest A-187 is glycidoxypropyltrimethoxysilane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | F | F |
| 0.1 | P | P | P |
| 0.5 | P | P | P |
| 1.0 | P | P | P |
| 2.0 | P | P | P |
| 4.0 | P | P | P |

In the following comparative examples, titanate, zircoaluminate and silane coupling agents are formulated in a vinyl acetate adhesive based on polyvinyl acetate. These polyvinyl acetate based adhesives bond melamine formaldehyde treated paper to particle board. However, they do not eliminate stress cracking. It is believed that the adhesive of these comparative examples did not have sufficient flexibility for accommodating shrinking of melamine formaldehyde resin treated decorative paper as it is bonded to particle board.

| Component | Amount* | Chemical | Manufacturer |
|---|---|---|---|
| XX-240 | 79.59 | Vinyl Acetate Homopolymer | Air Products & Chemicals P. O. Box 538 Allentown, PA 18105 |
| Pearl Starch | 14.97 | Corn Starch | A. E. Staley Mfg. Co. 2200 East Eldorado Decatur, IL 62525 |
| Santicizer 160 | 4.97 | Butyl Benzyl Phthalate | Monsanto Company 800 North Lindbergh Blvd. St. Louis, MO 63167 |
| Nuosept 95 | 0.20 | Bicyclic Oxazolidines Solution | Huls America, Inc. P. O. Box 365 Piscataway, NJ 08854 |
| Tektamer 38AD | 0.20 | 1,2-dibromo-2,4-dicyanobutane | Calgon Corporation P. O. Box 1346 Pittsburg, PA 15230 |
| Mazu DF 132 | 0.07 | Proprietary Defoamer | PPG Industries, Inc. PPG Place Pittsburgh, PA 15272 |

*Amount is by weight of the adhesive.

Tyzor® 131 titanate is mixed with the adhesive of this comparative example at the concentration shown on the following table. Concentration is percent by weight of the adhesive of this comparative example. Tyzor 131 is a mixed titanium ortho ester complex and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | P | F |
| 0.1 | P | P | P |
| 0.5 | P | P | P |
| 1.0 | P | P | P |
| 2.0 | P | P | P |
| 4.0 | P | P | P |

Tyzor LA titanate is mixed with the adhesive of this comparative example at the concentration shown on the following table. Concentration is percent by weight of the adhesive of this comparative example. Tyzor LA is dihydroxybis (ammonium lactato)titanium and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Manchem CPG is mixed with the adhesive of this comparative example at the concentration shown on the following table. Concentration is percent by weight of the adhesive of this comparative example. Manchem CPG is a carboxy zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | P | F |
| 0.1 | P | P | P |
| 0.5 | P | P | P |
| 1.0 | P | P | P |
| 2.0 | P | P | P |
| 4.0 | P | P | P |

Manchem APG-X is mixed with the adhesive of this comparative example at the concentration shown on the following table. Concentration is percent by weight of the adhesive of this comparative example. Manchem APO-X is an amino zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | P | F |
| 0.1 | P | P | P |
| 0.5 | P | P | P |
| 1.0 | P | P | P |
| 2.0 | P | P | P |
| 4.0 | P | P | P |

Silquest A-1100 silane is mixed with the adhesive of this comparative example at the concentration shown on the following table. Concentration is percent by weight of the adhesive of this comparative example. Silquest A-1100 is gamma-aminopropyl-triethoxysilane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |

Silquest A-1128 silane is mixed with the adhesive of this comparative example at the concentration shown on the following table. Concentration is percent by weight of the adhesive of this comparative example. Silquest A-1128 is an amino functional silane ester and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | P |
| 1.0 | P | F | F |
| 2.0 | P | F | P |
| 4.0 | F | F | P |

Silquest A-187 silane is mixed with the adhesive of this comparative example at the concentration shown on the following table. Concentration is percent by weight of the adhesive of this comparative example. Silquest A-187 is glycidoxypropyltrimethoxy-silane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | P |
| 1.0 | P | P | P |
| 2.0 | P | P | F |
| 4.0 | P | P | F |

In the following comparative examples, titanate, zircoaluminate and silane coupling agents are formulated in a vinyl acetate adhesive based on a polyvinyl acetate-ethylene copolymer. These vinyl acetate-ethylene copolymer based adhesives bond melamine formaldehyde treated paper to particle board. However, they do not eliminate stress cracking. It is believed that the adhesive of these comparative examples did not have sufficient flexibility for accommodating shrinking of melamine formaldehyde resin treated decorative paper as it is bonded to particle board.

| Component | Amount | Chemical | Manufacturer |
|---|---|---|---|
| Airflex 400 | 85.72 | Vinyl Acetate-Ethylene Copolymer | Air Products & Chemicals P. O. Box 538 Allentown, PA 18105 |
| Santicizer 160 | 5.53 | Butyl Benzyl Phthalate | Monsanto Company 800 North Lindbergh Blvd. St. Louis, MO 63167 |
| Ethylene Glycol | 1.86 | Ethylene Glycol | Celanese Chemical Company |

| Component | Amount | Chemical | Manufacturer |
|---|---|---|---|
| Mazu DF 132 | 0.14 | Proprietary Defoamer | 1250 West Mockingbird Dallas, TX 75247 PPG Industnes, Inc. One PPG Place Pittsburgh, PA 15272 |
| Triton X-100 | 0.01 | Octylphenoxy-polyethoxy-ethanol | Union Carbide Corporation Specialty Chemicals Danbury, CT 06817-0001 |
| Toluene | 6.74 | Toluene | Phibro Energy USA, Inc. 500 Dallas Avenue, Suite 3200 Houston, TX 7002 |

*Amount is by weight of the adhesive.

Tyzor 131 titanate is mixed with the adhesive of this comparative example at the concentration shown on the following table. Concentration is percent by weight of the adhesive of this comparative example. Tyzor 131 is a mixed titanium ortho ester complex and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | P |
| 4.0 | P | P | P |

Tyzor® LA titanate is mixed with the adhesive of this comparative example at the concentration shown on the following table. Concentration is percent by weight of the adhesive of this comparative example. Tyzor LA is dihydroxybis (ammonium lactato)titanium and is commercially available from Du Pont Chemicals, 1007 Market Street, Wilmington, Del. 19898.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Manchem CPG is mixed with the adhesive of this comparative example at the concentration shown on the following table. Concentration is percent by weight of the adhesive of this comparative example. Manchem CPG is a carboxy zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Manchem APG-X is mixed with the adhesive of this comparative example at the concentration shown on the following table. Concentration is percent by weight of the adhesive of this comparative example. Manchem APO-X is an amino zircoaluminate solution and is commercially available from Rhone-Poulenc Inc., Metal Organics, 275 Keystone Drive, Bethlehem, Pa. 18017.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Silquest A-1100 silane is mixed with the adhesive of this comparative example at the concentration shown on the following table. Concentration is percent by weight of the adhesive of this comparative example. Silquest A-1100 is gamma-aminopropyltriethoxysilane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Silquest A-1128 silane is mixed with the adhesive of this comparative example at the concentration shown on the following table. Concentration is percent by weight of the adhesive of this comparative example. Silquest A-1128 is an amino functional silane ester and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

Silquest A-187 silane is mixed with the adhesive of this comparative example at the concentration shown on the following table. Concentration is percent by weight of the adhesive of this comparative example. Silquest A-187 is glycidoxypropyltrimethoxy-silane and is commercially available from OSI Specialties, Inc., 39 Old Ridgebury Road, Danbury, Conn. 06810-5121.

| CONCENTRATION | CROSS HATCH (BEFORE) | CROSS HATCH (AFTER) | STRESS CRACK |
|---|---|---|---|
| None | P | P | F |
| 0.1 | P | P | F |
| 0.5 | P | P | F |
| 1.0 | P | P | F |
| 2.0 | P | P | F |
| 4.0 | P | P | F |

In the following comparative example Airflex 400H is a vinyl acetate-ethylene copolymer that is commercially available from Air Products and Chemicals, 7201 Hamilton Boulevard, Allentown, Pa. 18196-1501 Airflex 400H is a vinyl acetate-ethylene copolymer that is commercially available from Air Products and Chemicals, 7201 Hamilton Boulevard, Allentown, Pa. 18195-1501 is used for bonding melamine formaldehyde treated paper to particle board. However, they do not eliminate stress cracking. It is believed that the adhesive of these comparative examples did not have sufficient flexibility for accommodating shrinking of melamine formaldehyde resin treated decorative paper as it is bonded to particle board.

| ADHESIVE | CROSS HATCH (BEFORE) | CROSS HATCH (AFTER) | STRESS CRACK |
|---|---|---|---|
| Airflex 400H | P | P | F |

Vinyl acetate-ethylene copolymers function in adhesives for bonding melamine formaldehyde treated paper to particle board. However, the examples of this application did not eliminate stress cracking. It is believed that the adhesive of this example did not have sufficient flexibility for accommodating shrinking of melamine formaldehyde resin treated decorative paper as it is bonded to particle board.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty that reside in the present invention, including ail features that would be treated as equivalents thereof by those skilled the art to which this invention pertains.

We claim:

1. A polyvinyl acetate based adhesive for bonding melamine formaldehyde resin treated paper to particle board, comprising; polyvinyl acetate emulsion, tackified polyvinyl alcohol, starch, tackifier and water soluble or dispersible coupling agent, wherein the tackified polyvinyl alcohol comprises an admixture of polyvinyl alcohol, boric acid and phosphoric acid and wherein the water soluble or dispersible coupling agent is a member selected from the group consisting of titanate coupling agents, zircoaluminate coupling agents, gamma-glycidoxypropyltrimethoxy-silane, gamma-aminopropyltriethoxy-silane, amino modified organosilane ester and mixtures thereof.

2. The polyvinyl acetate based adhesive of claim 1, wherein the tackified polyvinyl alcohol comprises from about 1.5 to about 4.5 percent by weight of the adhesive.

3. The polyvinyl acetate based adhesive of claim 1, wherein the tackified polyvinyl alcohol comprises from about 2 to about 4 percent by weight of the adhesive.

4. The polyvinyl acetate based adhesive of claim 1, wherein the tackified polyvinyl alcohol comprises about 3.5 percent by weight of the adhesive.

5. The polyvinyl acetate based adhesive of claim 1, wherein the starch comprises from about 20 to about 35 percent by weight of the adhesive.

6. The polyvinyl acetate based adhesive of claim 1, wherein the starch is corn starch having a particle size of from about 5 to about 25 micron and a median particle size of about 15 microns.

7. The polyvinyl acetate based adhesive of claim 1, wherein the tackifier comprises from about 0 to about 15 percent by weight of the adhesive.

8. The polyvinyl acetate based adhesive of claim 1, wherein the tackifier comprises from about 5 to about 10 percent by weight of the adhesive.

9. The polyvinyl acetate based adhesive of claim 1, wherein the tackifier is buty benzyl phthalate.

10. The polyvinyl acetate based adhesive of claim 1, wherein the coupling agent comprises from about 1 to about 5 percent by weight of the adhesive.

11. The polyvinyl acetate based adhesive of claim 1, wherein the coupling agent comprises from about 1.5 to about 2.5 percent by weight of the adhesive.

12. The polyvinyl acetate based adhesive of claim 1, wherein the coupling agent is a titanate or zircoaluminate coupling agent or a mixture thereof.

13. The polyvinyl acetate based adhesive of claim 1, wherein the coupling agent is dihydroxybis (ammonium lactate) titanium or a mixed titanium ortho ester complex or mixtures thereof.

14. The polyvinyl acetate based adhesive of claim 1, wherein the coupling agent is carboxy zircoaluminate or amino zircoaluminate or a mixture thereof.

15. The polyvinyl acetate based adhesive of claim 1, wherein the coupling agent is gama-glycidoxypropyltrimethoxy-silane or gamma-aminopropyltriethoxy-silane or amino modified organosilane ester or a mixture thereof.

16. The polyvinyl acetate based adhesive of claim 1, wherein the coupling agent is a mixed titanium ortho ester complex.

17. A polyvinyl acetate based adhesive for bonding melamine formaldehyde resin treated paper to particle board, comprising; polyvinyl acetate emulsion, from about 2 to about 4 percent tackified polyvinyl alcohol solids by weight of the adhesive, from about 20 to about 35 percent starch solids by weight of the adhesive, from about 5 to about 10 percent tackifier solids by weight of the adhesive and from about 1.5 to about 2.5 percent water soluble or dispersible coupling agent solids by weight of the adhesive, wherein the tackified polyvinyl alcohol solids comprise an admixture of polyvinyl alcohol, boric acid and phosphoric acid and wherein the water soluble or dispersible coupling agent solids is a member selected from the group consisting of titanate coupling agents, zircoaluminate coupling agents, gamma-glycidoxypropyltrimethoxy-silane, gamma-aminopropyltriethoxy-silane, amino modified organosilane ester and mixtures thereof.

18. The polyvinyl acetate based adhesive of claim 17, wherein the starch is corn starch having a particle size of from about 5 to about 25 micron and a median particle size of about 15 microns.

19. The polyvinyl acetate based adhesive of claim 17, wherein the tackifier is butyl benzyl phthalate.

20. The polyvinyl acetate based adhesive of claim 17, wherein coupling agent is a titanate or zircoaluminate coupling agent or a mixture thereof.

21. The polyvinyl acetate based adhesive of claim 17, wherein the coupling agent is dihydroxybis (ammonium lactate) titanium or a mixed titanium ortho ester complex or mixtures thereof.

22. The polyvinyl acetate based adhesive of claim 17, wherein the coupling agent is carboxy zircoaluminate or amino zircoaluminate or mixtures thereof.

23. The polyvinyl acetate based adhesive of claim 17, wherein the coupling agent is gama-glycidoxypropyltrimethoxy-silane or gamma-aminopropyltriethoxy-silane or amino modified organosilane ester or mixtures thereof.

24. The polyvinyl acetate based adhesive of claim 17, wherein the coupling agent is a mixed titanium ortho ester complex.

25. A polyvinyl acetate based adhesive for bonding melamine formaldehyde resin treated paper to particle board, comprising; polyvinyl acetate emulsion, from about 2 to about 4 percent tackified polyvinyl alcohol solids by weight of the adhesive, from about 20 to about 35 percent starch solids having a particle size of from about 5 to about 25 micron and a median particle size of about 15 microns by weight of the adhesive, from about 5 to about 10 percent butyl benzyl phthalate tackifier solids by weight of the adhesive and from about 1.5 to about 2.5 percent of a mixed titanium ortho ester complex by weight of the adhesive, wherein the tackified polyvinyl alcohol solids comprise an admixture of polyvinyl alcohol, boric acid and phosphoric acid.

* * * * *